UNITED STATES PATENT OFFICE

2,467,436

PLASTICIZED HYDROXYLATED POLYMERIC FILM AND METHOD OF MAKING SAME

Daniel D. Lanning, Williamsville, N. Y., assignor to E. I. du Pont de Nemours & Company, Wilmington, Del., a corporation of Delaware No Drawing. Application December 18, 1943, Serial No. 514,819

21 Claims. (Cl. 117—145)

This invention relates to water-sensitive or swellable, non-fibrous films or webs, and more particularly to regenerated cellulose films or webs of high softener content, and to the process for preparing the same.

For convenience, the invention will be described principally in terms of regenerated cellulose film, although it is understood that it is not limited to this material.

In the manufacture of a typical sheet or film of regenerated cellulose (e. g., as described in Brandenberger, U. S. P. 1,548,864) there is incorporated in the film, prior to drying, about 10–15% of softener, usually glycerin. The purpose of this softener is to impart flexibility and some degree of toughness or durability, and while the sheets or film so produced are widely useful as wrapping tissue and the like, they still no not possess the high degree of tear-resistance and all-round toughness or durability required for many uses involving rough handling. Attempts to increase the durability of the film by the addition of more softener per se have been unsuccessful for the reason that the film tends to become sticky, and steps such as sizing of the film, are therefore necessary in order to avoid "caking" of film collected in rolls or stacks; additionally, the film becomes so soft that it is extremely difficult, if not impossible, to handle by means of automatic machinery; and finally, moistureproofing compositions commonly applied in the form of coatings on regenerated cellulose film do not adhere satisfactorily to highly softened film. Other expedients heretofore proposed for imparting added durability to regenerated cellulose film are likewise attended with one or more disadvantageous features which render them commercially unattractive.

A further objection to film or sheets of regenerated cellulose manufactured by the usual method and containing the normal amount of softener, is that such film is characterized by high transverse shrinkage during drying and in the conventional drying apparatus this operates to place the film under a higher tension in the "machine" or longitudinal direction thereof. As a consequence the cellulose micelles tend to become oriented along the longitudinal axis and thus the dried film exhibits a lower tear resistance in this direction than it does in the direction of its transverse axis. The obvious desideratum, of course, is for uniform resistance to tear in both directions of the film.

An object of this invention, therefore, is to provide a strong, durable film of high softener content, which is receptive to coatings and of sufficient rigidity or firmness to be commercially useful, particularly film of the wrapping tissue variety of approximately 0.001 to 0.003 inch in thickness.

Another object is to produce by a convenient and economical method, a non-fibrous, non-tacky film of water-sensitive cellulosic material which has high uniform tear strength in all directions, enhanced durability, rigidity or firmness sufficient to permit handling of the film in automatic machines, and acceptable receptivity to moistureproofing and like coatings.

It is a still further object of the invention to produce a regenerated cellulose film of high softener content having a moistureproof coating firmly secured to the base sheet.

These and other objects will more clearly appear as the description develops.

I have found that if a water-soluble or water-dispersible incompletely condensed synthetic resin capable of rapid transformation in situ to the insoluble state under the influence of temperatures normally encountered in the film-drying step, i. e. temperatures between about 60° and about 90° C., is incorporated in a water-sensitive, non-fibrous film such as regenerated cellulose film prior to the initial drying step, the desirable physical structure characteristic of the film in the gel stage will be retained in the film even after normal drying operations have taken place and a large percentage of softener may be incorporated in such film without imparting thereto the undesirable properties usually associated with high-softener-content film. Alternatively, water-soluble resin forming materials may be employed in place of the incompletely condensed synthetic resin.

Accordingly, the objects of this invention are accomplished by incorporating in gel film, such as regenerated cellulose gel film, a large amount of softener, a water-soluble or water-dispersible incompletely condensed synthetic resin or resin-forming materials capable of rapid conversion in situ to an insoluble resin at temperatures of from about 60° to about 90° C., and, if desired, a condensing agent or catalyst; thereafter drying the film in the usual fashion, and then coating the film with a moistureproofing coating composition if desired.

The invention contemplates a non-fibrous base sheet or film of water-sensitive material, such as regenerated cellulose. Other equivalent base materials include lowly substituted cellulose ethers, such as methyl cellulose, ethyl cellulose or glycol celluose, and other water-sensitive, film-forming materials, such as polyvinyl alcohol.

Any of the known softeners capable of being used in high concentrations and adapted for use with the selected base sheet or film may be employed for purposes of this invention; thus, there may be included the following materials: polyhydric alcohols including lycols, amines or amino alcohols or salts thereof, hydroxy amides, ether alcohols, sulfones, sulfoxides and urea or other softeners known to the art. Glycerin is the preferred softener for regenerated cellulose film.

The softener content of the finished film may vary from approximately 30% to 60%. Experience has shown in the case of regenerated cellulose film softened with glycerin that this amount of softener may be incorporated in a film by passing it through a bath containing 10% to 40% glycerin for a length of time sufficient to thoroughly impregnate it. Excess bath liquid may be removed, if desired, by any suitable means, as for example, by passing the film through squeeze rolls.

The resins which may be advantageously employed comprise the water-soluble or water-dispersible incompletely condensed synthetic type which are capable of being rapidly converted in situ to the insoluble state at temperatures normally encountered in the usual film-drying step (i. e., 60°–90° C.). The following resins, in their partially polymerized state, may be employed: phenol-formaldehyde resins, dimethylol urea resins, dimethylol urea ether resins, melamine-formaldehyde resins, amino-triazine aldehyde resins; aldehyde condensation products, such as casein formaldehyde, guanidine formaldehyde, aliphatic and aryl ketones with formaldehyde, urethane aldehyde and cyanamide aldehyde; furfuramide resins and furfural reaction products with amines, phenols, and ketones; thiocyanate resins; thio-urea resins; acroleinurea resins; and urea-aldehyde modified phthalic acid glycerol resins. Alternatively there may be employed resin-forming compositions capable of forming in situ the desired resin, e. g. phenol and formaldehyde.

It is to be appreciated, of course, that the amount of resin employed will depend on practical circumstances and may vary considerably, depending upon the particular resin employed. In general, however, best results will be obtained when the finished film contains from 1% to 10% resin.

Catalysts suitable for the practice of this invention are acids commonly used for polymerization of the type of resin employed, for example, maleic acid, paratoluene sulfonic acid and the like. Concentrations of the catalyst generally vary from 5% to 20%, based on the weight of resin used in the treating bath.

Incorporation of the resins or resin-forming materials may be accomplished by impregnating the gel film with an aqueous bath comprising the softener, resin and catalyst, or by incorporating the resin in the solution from which the film is cast, for example, in the aqueous alkaline cellulose xanthate solution, or by passing the film through a softener bath containing no resin and thereafter spraying it with an aqueous solution or dispersion of the resin or resin-forming materials before it is dried.

Suitable modifications of the softener bath contemplate the incorporation of dyeing agents, flame-proofing agents, slip agents, sizing agents and the like in the manner known to the art without departing from the spirit of the invention.

The method of providing typical non-fibrous base film with moistureproof coatings is described in Charch and Prindle U. S. P. 1,737,187, Charch and Craigue U. S. P. 1,826,697, and Ubben U. S. P. 2,147,180. Any moistureproofing composition which gives acceptable results with cellophane of standard softener content is suitable for the purposes of this invention.

The following examples further illustrate the principles of my invention and divers embodiments including the best mode contemplated for carrying out the same. Parts and percentage compositions are by weight unless otherwise indicated.

EXAMPLE I

A sheet or film of gel regenerated cellulose, such that the final dry thickness will be about 0.003 inch, is cast and purified in the usual fashion. Before drying, it is passed through a bath containing 35% glycerin, 7% of a partially polymerized dimethylol urea resin and 0.75% maleic acid for a time sufficient to thoroughly impregnate it (at least five seconds). Excess bath is removed by means of squeeze rolls and the film is then dried in the usual way, by bringing the film directly from the squeeze rolls into contact with heated rolls and drying the sheet at temperatures between 60° and 90° C.

The product is a clear, flexible film containing 43.3% glycerin, 5.3% resin and 51.4% cellulose calculated on a moisture-free basis. The film, as finished, actually contains approximately 7% moisture.

EXAMPLE II

A regenerated cellulose film is prepared as in Example I except that the softener bath contains 32% glycerin and 2% phenol-formaldehyde resin.

The resin is prepared from the following materials:

| | Parts |
|---|---|
| Phenol | 100 |
| 40% Formaldehyde | 100 |
| Potassium hydroxide | 2.5 |

Approximately 1 part of pure ammonium hydroxide is added to the above to prevent precipitation of the resin and the solution is refluxed for a period sufficient to effect partial condensation of the phenol and formaldehyde (approximately 30 minutes). The preparation of this resin is more fully described in U. S. P. 1,799,816.

To prepare the softener bath, approximately 130 parts of the so-obtained resin solution is added to a mixture of 1050 parts of glycerin and 2090 parts of water.

The product is a clear, flexible film sufficiently rigid or firm to be easily handled. It contains approximately 7% moisture and shows a glycerin content of 45% and a resin content of 2% calculated on a moisture-free basis.

EXAMPLE III

A regenerated cellulose film is prepared as in Example I except that the softener bath contains 25% glycerin, 7% monomethyl ether of dimethylol urea and 0.75% of maleic acid.

The finished film contains approximately 7% moisture and is clear and flexible. It shows upon analysis a content of 45% glycerin and 7% resin calculated on a moisture-free basis.

A comparison of the properties of highly softened film which are derived from preserving the gel structure in the film as described above, and prior art film is given in the following table.

Table I

| | Rigidity | Axial Orien. | Durability (No. drops) | | Tear Strength | |
| --- | --- | --- | --- | --- | --- | --- |
| | | | 75° C. | 0° C. | Transverse Grams | Linear Grams |
| | | Per cent | | | | |
| Film of Ex. I | Good | 5 | 1,062 | 300+ | 20.5 | 27.5 |
| Film of Ex. II | ---do--- | 5 | 638 | 233 | 23.0 | 17.3 |
| Film of Ex. III | ---do--- | 5 | 600 | 300+ | 20.5 | 18.2 |
| Film containing approx. 45% glycerin and no resin and measuring 0.003 inch in thickness. | Very limp | 5 | 1,500 | 300+ | 47.0 | 25.0 |
| Normal film containing approx. 16.5% glycerin and measuring approx. 0.002 inch in thickness. | Good | 17 | 140 | 10 | 14.0 | 8.0 |

By "rigidity" is meant that property which is the opposite of limpness; in other words, rigidity in the sense that the film can be advanced in a wrapping machine or similar apparatus without curling, crumpling or otherwise fouling the machine.

By "axial orientation" is meant molecular orientation of the cellulose micelles as measured by bi-refringence methods.

By "durability" is meant the number of times a bag fabricated from the film and filled with 200 grams of dry beans may be dropped without breaking. The test is conducted in an atmosphere of 35% relative humidity. This test is more fully described in U. S. P. 2,275,347 (Charch and Alles).

The "tear strength" is measured by a modification of the method described in Technical Association Pulp and Paper Industry Publication T414m-40. A test sample 2 inches wide and 2.5 inches long is used. An initial cut 0.75 inch long and located midway between the ends is made at right angles to one edge of the sample. The tear strength is the total force in grams required to extend the initial tear. Tear strength values are generally measured as (a) linear or in the direction in which the film is advanced in the machine, and (b) transverse or crosswise of the direction of travel of the film. In ordinary regenerated cellulose film, the transverse values are generally greater than the linear.

As shown in the above Table I, films prepared by the method of this invention show physical properties comparable with those of highly softened film yet possessing rigidity or firmness comparable with that of normally softened film. Durability compares favorably with highly softened film and is appreciably higher than that of ordinary film while the tear strengths are more nearly equal in both directions.

Example IV

A sheet or film of gel regenerated cellulose, such that the final dry thickness will be about 0.001 inch, is cast and purified in the usual fashion. Before drying, it is passed through a bath containing 25% glycerin, 5% of a water-soluble melamine-formaldehyde polymerization product and 0.7% maleic acid.

The finished product is a clear, flexible film which contains approximately 6% moisture. Upon analysis, the film shows a content of 43.7% glycerin and approximately 5% resin calculated on a moisture-free basis.

Despite the relative thinness and the high softener content of this film, it possesses good rigidity or firmness.

Example V

The film of Example I is coated with a resin composition of the following formula and the coated film is dried.

| | Per cent |
| --- | --- |
| Urea-formaldehyde resin | 2.40 |
| P-toluene sulfonic acid | 0.30 |
| Nitrocellulose (high viscosity) | 0.30 |
| Ethyl acetate | 48.68 |
| Toluene | 24.28 |
| Isobutanol | 24.04 |

Example VI

The film of Example I is coated with a moistureproofing composition of the following formula and the coated film is dried.

| | Per cent |
| --- | --- |
| Paraffin wax, M. P. 60° C | 0.35 |
| Polyhydric alcohol ester of a synthetic terpinene-maleic anhydride polybasic acid resin complex, comprising essentially 3-isopropyl - 6 - methyl - 3:6-endoethylene-delta-4-tetrahydro-phthalic anhydride | 0.59 |
| Damar | 1.17 |
| Dibtuyl phthalate | 3.74 |
| Nitrocellulose (11% N) | 5.85 |
| Ethyl alcohol | 3.60 |
| Toluene | 22.90 |
| Ethyl acetate | 61.80 |

The above composition is similar to that described in Example IX of U. S. P. 2,236,546 to Mitchell.

Example VII

The film of Example I is coated with the resin composition used in Example V.

The coated film is dried and is then coated with the moistureproofing composition of Example VI and the coated film is again dried.

Example VIII

The film of Example I is coated with a moistureproofing composition of the following formula and the coated film is dried.

| | Per cent |
| --- | --- |
| Nitrocellulose (11.4% N) | 3.98 |
| Urea - formaldehyde monohydric alcohol (isobutanol) resin (solids basis) | 2.95 |
| Ester gum-rosin and maleic acid glyceride mixture or complex having a melting range of 119°–215° F. and an acid number of 17–22 | 0.58 |
| Maleic acid | 0.56 |
| Paraffin wax, M. P. 60° C | 0.47 |
| Dibtuyl phthalate | 2.57 |
| Ethyl alcohol | 2.30 |
| Isobutanol | 17.00 |
| Toluene | 28.40 |
| Ethyl acetate | 40.60 |

The above composition is a modification of that described in Example X of U. S. P. 2,301,959 to Lanning.

Comparison of the properties of the films prepared in Examples V to VIII with film of corresponding softener content containing no resin may be observed in the following table.

*Table II*

| | Moisture Permeability Value (Approx.) | Heat Seal, Grams | Anchorage | Stripping Test |
|---|---|---|---|---|
| Film of Ex. V | 6,000 | 0 | Good | Good. |
| Film of Ex. VI | 8 | 190 | do | Fair. |
| Film of Ex. VII | 19 | 722 | do | Good. |
| Film of Ex. VIII | 30 | does not heat seal. | do | Do. |
| Film of normal softener content coated with formula of Ex. VIII | 25 | do | do | Do. |
| Highly softened film containing no resin, coated with formula of Ex. VI | | cannot be heat-sealed. | Fails | Coating easily removed. |

The "moisture permeability values" and the "heat-seal" values shown in the above table are measured by the methods described in U. S. P. 2,147,180 to Ubben.

By "anchorage" is meant the adhesion of a coating to the base sheet in such a way that the finished product will withstand the deleterious effect of water or moisture and the surface coating will not loosen and/or flake off from the base when the product is directly in contact with water or moisture for appreciable periods of time, e. g. for a period of 3 days at 20° C.

The "stripping test" is made as follows: One end of a strip of transparent pressure-sensitive regenerated cellulose adhesive tape is pressed firmly on the coated sheet, leaving the opposite end free. The free end of the tape is then stripped from the film, i. e. peeled back on itself. In the case of coatings firmly secured to the base sheet, the tape will be stripped from the coated film, while coatings not firmly secured will be stripped from the base sheet.

Examination of the figures in the above table indicates how film prepared by the method of this invention may be satisfactorily surface-coated in contrast to highly softened film containing no resin. Thus, as illustrated in Example V, the method provides a product which may be lacquered or varnished or on which suitable adhesives may be applied. The formula of Example VI is typical of a moisture proof coating which may be applied directly to the base sheet. While this coating would not be anchored to a film of normal softener content, it is noted that in the case of highly softened film, this coating does not even adhere to the base sheet. Example VII shows how a combination of the two types of coatings in the previous cases may be used to decided advantage. The formula of Example VIII, wherein no sub-coat is used, is typical of a self-anchoring coating which would also adhere to film of normal softener content and shows good adherence to film of this invention but cannot be secured to the base sheet of highly softened film unless the resin is used.

EXAMPLE IX

The film of Example IV is coated with the moistureproofing composition of Example VI and the film is dried.

The finished film shows a permeability value of approximately 20, a heat-seal value of 543 grams and good anchorage.

By comparison with the values shown in Table II, it is observed that this film, though relatively thin, compares favorably with the films described in Examples VI and VII.

EXAMPLE X

A sheet or film of gel regenerated cellulose, such that the final dry thickness will be about 0.001 inch, is cast and purified in the usual fashion. Before drying, it is soaked for five minutes in a bath having the following composition:

| | Percent |
|---|---|
| Urea | 3.0 |
| Paraldehyde | 9.0 |
| Glycerin | 30.0 |
| Water | 57.5 |
| Maleic acid | 0.5 |

Excess bath liquid is removed by means of squeeze rolls and the sheet is dried for one minute at a temperature of 100° C. The dried sheet is then coated with the composition of Example VI and again dried.

This film shows good adhesion of the lacquer coating to the base sheet material.

Unique advantages of the film of this invention reside chiefly in its high durability at both high and low temperatures. Moreover, in contrast to prior art film of corresponding softener content, it possesses additionally the property of receptivity to moistureproof coatings which are securely anchored to the base sheet and, if desired, heat-sealable. It also possesses high uniform tear strength. Such film is highly suitable for many uses for which regenerated cellulose film has heretofore not proven satisfactory. Thus, it is useful for the packaging of materials of high moisture content, such as cheese, other foodstuffs, etc., particularly when such are submitted to severe handling, for the protection against moisture of metal objects, such as machines, engine and motor parts, ammunition supplies, etc.

As many widely different embodiments of this invention may be made without departing from the spirit and scope thereof, it is to be understood that this invention is not limited to the specific embodiments thereof except as defined in the appended claims.

I claim:

1. A durable non-fibrous self-sustaining film of water-sensitive film-forming hydroxylated material from the group consisting of regenerated cellulose, lowly substituted cellulose ethers and polyvinyl alcohol, impregnated with from about 30% to about 60% by weight of softener for said film-forming material, said softener being a water-soluble, hydroxy compound from the group consisting of amino alcohols, salts of amino alcohols, hydroxy amides, ether alcohols, glycols and glycerol, and an insoluble synthetic resin formed in situ at temperatures of from about 60° C. to about 90° C.

2. A durable non-fibrous self-sustaining film of water-sensitive film-forming hydroxylated material from the group consisting of regenerated cellulose, lowly substituted cellulose ethers and polyvinyl alcohol, impregnated with from about 30% to about 60% by weight of softener for said film-forming material, said softener being a water-soluble, hydroxy compound from the group consisting of amino alcohols, salts of amino alcohols, hydroxy amides, ether alcohols, glycols and glycerol, and from about 1% to about 10% by weight of an insoluble synthetic resin formed in situ at temperatures of from about 60° C. to about 90° C.

3. A durable non-fibrous self-sustaining film of regenerated cellulose impregnated with from about 30% to about 60% of softener for regenerated cellulose, said softener being a water-soluble, hydroxy compound from the group consisting of amino alcohols, salts of amino alcohols, hydroxy amides, ether alcohols, glycols and glycerol, and an insoluble synthetic resin formed in situ at temperatures of from about 60° C. to about 90° C.

4. A durable non-fibrous self-sustaining film of regenerated cellulose impregnated with from about 30% to about 60% by weight of softener for regenerated cellulose, said softener being a water-soluble, hydroxy compound from the group consisting of amino alcohols, salts of amino alcohols, hydroxy amides, ether alcohols, glycols and glycerol, and from about 1% to about 10% by weight of an insoluble synthetic resin formed in situ at temperatures of from about 60° C. to about 90° C.

5. A durable non-fibrous self-sustaining film of regenerated cellulose impregnated with from about 30% to about 60% by weight of glycerin and from about 1% to about 10% by weight of an insoluble synthetic resin formed in situ at temperatures of from about 60° C. to about 90° C.

6. A durable non-fibrous self-sustaining film of water-sensitive film-forming hydroxylated material from the group consisting of regenerated cellulose, lowly substituted cellulose ethers and polyvinyl alcohol, impregnated with from about 30% to about 60% by weight of softener for said film-forming material, said softener being a water-soluble, hydroxy compound from the group consisting of amino alcohols, salts of amino alcohols, hydroxy amides, ether alcohols, glycols and glycerol, and an insoluble synthetic resin formed in situ at temperatures of from about 60° C. to about 90° C., and coated with a moistureproofing coating composition for cellophane.

7. A durable non-fibrous self-sustaining film of regenerated cellulose impregnated with from about 30% to about 60% by weight of softener for regenerated cellulose, said softener being a water-soluble, hydroxy compound from the group consisting of amino alcohols, salts of amino alcohols, hydroxy amides, ether alcohols, glycols and glycerol, and an insoluble synthetic resin formed in situ at temperatures of from about 60° C. to about 90° C., and coated with a moistureproofing coating composition for cellophane.

8. A durable non-fibrous self-sustaining film of regenerated cellulose impregnated with from about 30% to about 60% by weight of softener for regenerated cellulose, said softener being a water-soluble, hydroxy compound from the group consisting of amino alcohols, salts of amino alcohols, hydroxy amides, ether alcohols, glycols and glycerol, and from about 1% to about 10% by weight of an insoluble synthetic resin formed in situ at temperatures of from about 60° C. to about 90° C., and coated with a moistureproofing coating composition for cellophane.

9. A durable non-fibrous self-sustaining film of regenerated cellulose impregnated with from about 30% to about 60% by weight of glycerin and from about 1% to about 10% by weight of an insoluble synthetic resin formed in situ at temperatures of from about 60° C. to about 90° C., and coated with a moistureproofing coating composition for cellophane.

10. In the process for preparing non-fibrous self-sustaining film from synthetic, water-sensitive film-forming hydroxylated material from the group consisting of regenerated cellulose, lowly substituted cellulose ethers and polyvinyl alcohol, the improvement which comprises incorporating into the film before it is initially dried from about 30% to about 60% by weight, based on the weight of air-dried film, of softener for said film-forming material, said softener being a water-soluble, hydroxy compound from the group consisting of amino alcohols, salts of amino alcohols, hydroxy amides, ether alcohols, glycols and glycerol, and water-soluble material capable of being rapidly converted in situ into insoluble resin at temperatures of from about 60° C. to about 90° C., and thereafter drying said film at temperatures effective to convert said water-soluble material to the insoluble resin state.

11. In the process for preparing non-fibrous self-sustaining film from synthetic, water-sensitive film-forming hydroxylated material from the group consisting of regenerated cellulose, lowly substituted cellulose ethers and polyvinyl alcohol, the improvement which comprises incorporating into the film before it is initially dried from about 30% to about 60% by weight, based on the weight of air-dried film, of softener for said film-forming material, said softener being a water-soluble, hydroxy compound from the group consisting of amino alcohols, salts of amino alcohols, hydroxy amides, ether alcohols, glycols and glycerol, and water-soluble, incompletely condensed, synthetic resin capable of being rapidly converted in situ into insoluble resin at temperatures of from about 60° C. to about 90° C., and thereafter drying said film at temperatures effective to convert said water-soluble material to the insoluble resin state.

12. In the process for preparing non-fibrous self-sustaining film from synthetic, water-sensitive film-forming hydroxylated material from the group consisting of regenerated cellulose, lowly substituted cellulose ethers and polyvinyl alcohol, the improvement which comprises incorporating into the film before it is initially dried from about 30% to about 60% by weight, based on the weight of air-dried film, of softener for said film-forming material, said softener being a water-soluble, hydroxy compound from the group consisting of amino alcohols, salts of amino alcohols, hydroxy amides, ether alcohols, glycols and glycerol, and water-soluble resin-forming materials capable of being rapidly converted in situ into insoluble resin at temperatures of from about 60° C. to about 90° C., and thereafter drying said film at temperatures effective to convert said water-soluble material to the insoluble resin state.

13. In the process for preparing non-fibrous self-sustaining film from synthetic, water-sensitive film-forming hydroxylated material from the group consisting of regenerated cellulose, lowly substituted cellulose ethers and polyvinyl alcohol, the improvement which comprises incorporating into the film before it is initially dried from about 30% to about 60% by weight, based on the weight of air-dried film, of softener for said film-forming material, said softener being a water-soluble, hydroxy compound from the group consisting of amino alcohols, salts of amino alcohols, hydroxy amides, ether alcohols, glycols and glycerol, and from about 1% to about 10% by weight of a water-soluble, incompletely condensed synthetic resin capable of being rapidly converted in situ into insoluble resin at temperatures of from about 60° C. to about 90° C., and thereafter drying said film at temperatures effective to convert said water-soluble material to the insoluble resin state.

14. In the process of forming non-fibrous self-sustaining film from regenerated cellulose, the improvement which comprises incorporating into the film before it is initially dried from about 30% to about 60% by weight, based on the weight of air-dried film, of softener for regenerated cellulose, said softener being a water-soluble, hydroxy compound from the group consisting of amino alcohols, salts of amino alcohols, hydroxy amides, ether alcohols, glycols and glycerol, and water-soluble, incompletely condensed, synthetic resin capable of being rapidly converted in situ into insoluble resin at temperatures of from about 60° C. to about 90° C., and thereafter drying said film at temperatures effective to convert said water-soluble material to the insoluble resin state.

15. In the process of forming non-fibrous self-sustaining film from regenerated cellulose, the improvement which comprises incorporating into the film before it is initially dried from about 30% to about 60% by weight, based on the weight of air-dried film, of softener for regenerated cellulose, said softener being a water-soluble, hydroxy compound from the group consisting of amino alcohols, salts of amino alcohols, hydroxy amides, ether alcohols, glycols and glycerol, and water-soluble resin-forming materials capable of being rapidly converted in situ into insoluble resin at temperatures of from about 60° C. to about 90° C., and thereafter drying said film at temperatures effective to convert said water-soluble material to the insoluble resin state.

16. The film of claim 5 wherein the resin is a dimethylol urea resin.

17. The film of claim 5 wherein the resin is a dimethylol urea ether resin.

18. The film of claim 5 wherein the resin is a melamine-formaldehyde resin.

19. The process of claim 14 wherein the resin is a dimethylol urea resin.

20. The process of claim 14 wherein the resin is a dimethylol urea ether resin.

21. The process of claim 14 wherein the resin is a melamine-formaldehyde resin.

DANIEL D. LANNING.

REFERENCES CITED

The following references are of record in the file of this patent:

UNITED STATES PATENTS

| Number | Name | Date |
| --- | --- | --- |
| 1,737,187 | Charch | Nov. 26, 1929 |
| 2,116,193 | Drew | May 3, 1938 |
| 2,224,293 | Finlayson | Dec. 10, 1940 |
| 2,234,016 | Woodhouse | Mar. 4, 1941 |
| 2,280,829 | Gebens | Apr. 28, 1942 |
| 2,301,959 | Lanning | Nov. 17, 1942 |
| 2,374,767 | Mitchell | May 1, 1945 |

FOREIGN PATENTS

| Number | Country | Date |
| --- | --- | --- |
| 472,264 | Great Britain | Sept. 20, 1937 |